Dec. 3, 1929.     J. M. ALLEN     1,738,165
ELECTRIC MOTOR
Filed April 5, 1926     2 Sheets-Sheet 1

INVENTOR
JAMES M. ALLEN
BY Edward E. Longan
ATTY.

Dec. 3, 1929. J. M. ALLEN 1,738,165
ELECTRIC MOTOR
Filed April 5, 1926  2 Sheets-Sheet 2
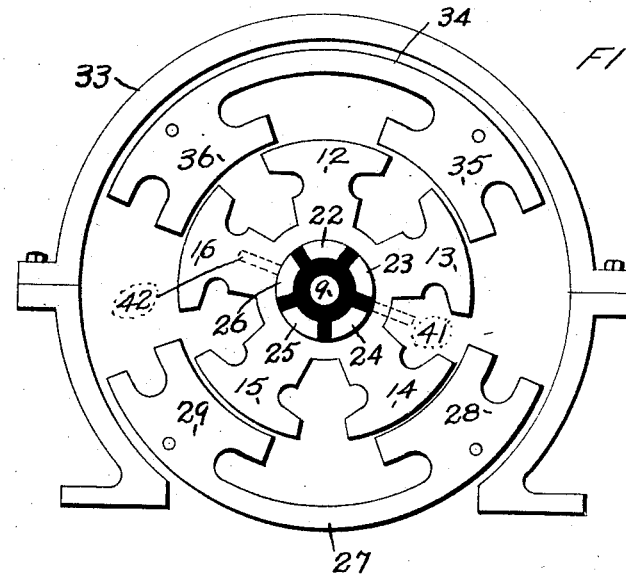
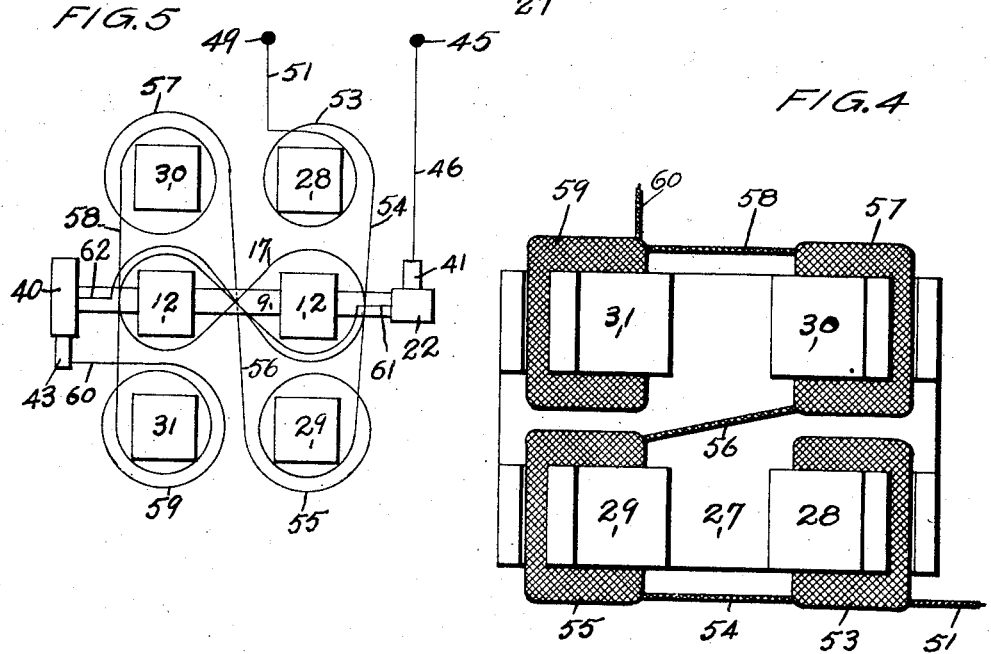
INVENTOR
JAMES M. ALLEN
BY Edward E. Longan
ATTY.

Patented Dec. 3, 1929

1,738,165

UNITED STATES PATENT OFFICE

JAMES M. ALLEN, OF ST. LOUIS, MISSOURI

ELECTRIC MOTOR

Application filed April 5, 1926. Serial No. 99,753.

My invention relates to improvements in electric motors, and has for its primary object an electric motor of any size which is designed to be driven by alternating current and which is so arranged that there will be no dead center on the armature.

In the drawings:

Fig. 3 is a side elevation of the armature and field magnets in position and before the coils are wound thereon;

Fig. 4 is a top plan view of the lower set of field magnets; and

Fig. 5 is a diagrammatic view showing the wiring of one set of field magnets and one armature magnet and the electrical connections thereto.

Figure 1:
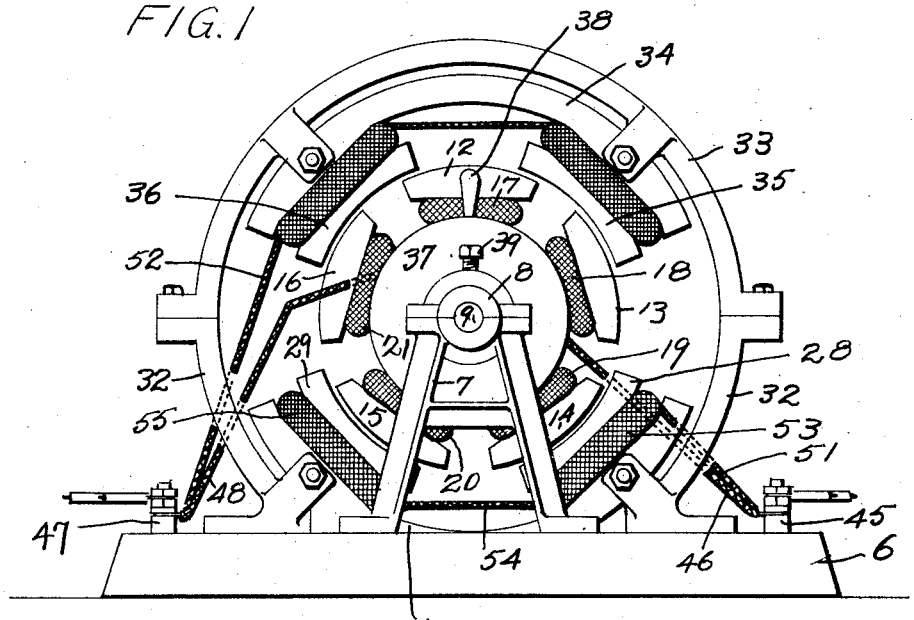
Fig. 1 is a side elevation of my device.
Figure 2:
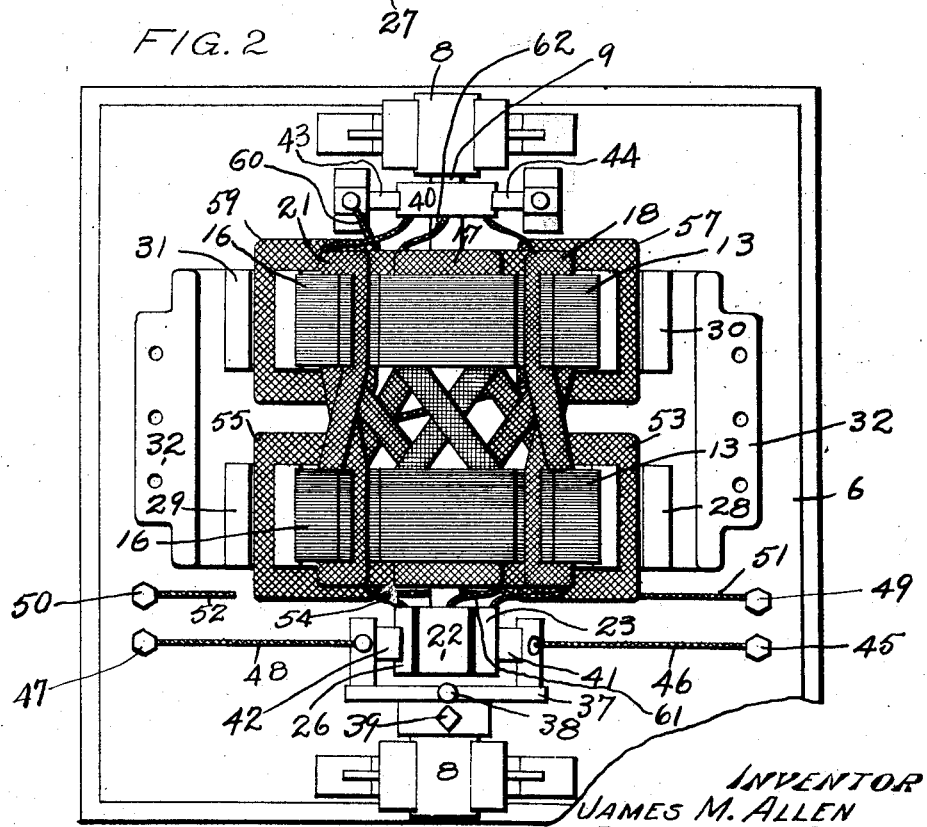
Fig. 2 is a top plan view with the upper field magnets removed.

In the construction of my device I employ a base 6 on which are mounted standards 7. The standards 7 are provided with journal boxes 8 in which the motor shaft 9 is mounted. Mounted on the shaft 9 and spaced apart longitudinally thereon are armature cores. These cores are built up of thin plates so as to make a laminated core. This lamination is common to ordinary armature cores and therefore it will not be described in detail. Each of the cores is provided with poles 12, 13, 14, 15 and 16, in the present drawing there being 5 poles although the number may be varied according to the size of the motor, it being essential, however, that the armature have an odd number of poles as will be explained in detail later. It will be noted from Fig. 3 that the construction of these poles is virtually T shaped with the head toward the outside so that when the coils 17, 18, 19, 20 and 21 are wound thereon, there will be no tendency to throw them off of the poles by centrifugal action when the device is in operation.

Mounted on the shaft 9 and insulated therefrom is a commutator having segments 22, 23, 24, 25 and 26, these segments corresponding in number to the number of poles on the armature. The segments of the commutator are connected to the armature coil directly adjacent thereto. In other words, the segment 22 is connected to the coil 17, the same manner of connection being followed throughout the circle. Located on the underside of the armature is a field magnet 27, which has poles 28, 29, 30 and 31. This field magnet is so spaced that the poles thereof will be separated from the poles of the armature by a small air space as is the common practice with all motors and generators. The field magnet 27 is supported by means of brackets 32 which are secured to the base. Secured to the brackets 32 is a semi-circular bracket 33 which supports the field magnet 34. This field magnet is provided with poles 35 and 36, there being, however, 4 poles on this field magnet, the same as on the lower field magnet. The winding of this magnet is also the same as will be hereinafter described for the lower magnet.

Rotatably mounted on one of the bearings 8 is a brush support 37. This support can be rotated by means of a handle 38 and is for the purpose of adjusting the brushes, and when once adjusted is held in position by means of a set screw 39 so as to prevent any accidental movement. Mounted on the shaft 9 and one the side of the armature opposite the segmental commutator is a ring commutator 40. To this ring commutator all of the coils of the armature are connected. The brushes 41 and 42 are carried by the brush holder 37 while brushes 43 and 44 contact with the ring commutator.

Mounted on the base 6 is a binding post 45 from which a conductor 46 leads to the brush 41. A binding post 47 is also mounted on the base 6 from which a conductor 48 leads to the brush 42. The base 6 is also provided with binding posts 49 and 50 from which conductors 51 and 52 lead. These conductors will be explained in detail later. It is to be understood, of course, that the binding posts 45, 47, 49 and 50 are connected to lead-in wires from a suitable source of electrical energy. The winding of the field magnet is as follows:

The wire 51 leading from the binding post 49 is first given a suitable number of turns around the pole 28 forming a coil 53. From this coil a single wire 54, which is a continuation of the coil, leads across and is wrapped around the pole 29 forming the coil 55. From this coil a wire 56 leads to the pole 30 around which it is wrapped forming a coil 57. From this coil a single wire 58 leads to the pole 31 around which it is wrapped forming the coil 59. A single wire 60 leads from this coil and is attached to the brush 43 which is in contact with the ring commutator 40. This completes the winding of the lower field magnet, the upper field magnet is wound in the same way by means of the wire 52 leading from the binding post 50.

I will now describe the winding of one of the coils on the armature, namely the coil 17:

Leading from the segment 22 is a wire 61. This wire is wrapped around the pole 12 in the form of a figure 8 (see Fig. 5) thereby forming the coil 17. From the opposite end of this coil is a wire 62 which is attached to the ring commutator 40. In this manner the circuit is completed. We will presume that the electric current enters by the post 45 and leaves by the post 49 so that the completed circuit will be as follows: The current entering the post 45 passes through the wire 46 into the brush 41. From there it enters the segment 22, then the wire 61, passes through the coil 17, through the wire 62 into the ring commutator 40. From there it is taken off by the brush 43 and enters the wire 60. It then passes around through the coil 59, over the wire 58, through the coil 57, over the wire 56, through the coil 55, over the wire 54, then through the coil 53, and out through the wire 51 into the binding post 49. In this manner the electric circuit is completed. It is to be understood, of course, that the upper field magnet 34 is wound and connected in the same manner as the field magnet 27 and all of the coils on the armature are wound in an identical manner. It is also to be understood that the number of turns around each one of the field magnets is the same so that the poles thereof will all have the same magnetic strength, the number of turns on the poles of the armature being the same for the same reason. An essential feature of my device is that the armature has an odd number of poles whereas the field magnets consist of an equal number of poles. In this way it will be impossible for the magnetic fields of the armature and the field magnets to counter-act each other in such a manner as to cause a "dead spot" or what might be called a "dead center" over which it would be necessary to force the armature by hand or otherwise in order to start the rotation.

The brushes 41 and 42 are so arranged that one brush will always be in contact with a commutator segment and in such a manner that the segment contacted with energizes an armature coil which is approaching a field magnet so that the motor will always start to turn in the same direction. This is clearly shown in Fig. 3 where the brushes are shown by dotted lines, the brush 42 being on the commutator segment 26 thus energizing the coil 21 which is approaching the magnet 36, while the brush 41 is on the insulation dividing segments 23 and 24. As soon as the coil 21 is energized, it is attracted by the magnet 36 and rotates the commutator. During this rotation the coil 18 is approaching the coils 53, and 57, and upon being energized will be attracted thereto. By shifting the brush holder 37, the position of the brushes and consequently the energizing of the armature coils can be advanced or retarded and the speed of the motor controlled thereby similar to the spark advance in a gasoline motor because if the armature coil is energized sooner, it will attain a greater momentum in passing a field magnet than if the coil or rather the pole is already overlapping that magnet.

Having fully described my invention, what I claim is:

1. An electric motor comprising a shaft, a pair of laterally spaced armature sections secured on and insulated from said shaft, an odd number of T-shaped radially extending poles integral with each section and in lateral alignment with each other, a continuous coil, all the strands of which are arranged in the shape of a figure 8 surrounding each pair of laterally aligned poles, a segmental commutator mounted on said shaft to one side of said armature, a conductor for connecting a segment with one end of a coil, a ring commutator located on said shaft on the opposite side of said armature, and electric conductors for connecting the opposite ends of said coils to said ring commutator.

2. An electirc motor comprising a shaft, a pair of laterally spaced armature sections, each having an odd number of T-shaped poles projecting radially therefrom mounted on said shaft, a coil in the shape of a figure 8 surrounding each pair of laterally spaced poles, a segment commutator carried by said shaft to one side of said armature, connections between said commutator sections at one end of said coils whereby the same can be intermittently energized, a ring commutator carried by said shaft and on the opposite side of said armature, and connections leading from the opposite end of each of said coils to said ring commutator whereby electricity can pass therefrom while said coils are energized.

3. An electric motor comprising a shaft, an armature composed of a pair of laterally spaced apart sections having integral poles projecting radially therefrom, said poles being in lateral alignment with each other, a continuous coil wound in the form of a figure 8 surrounding each pair of laterally aligned poles, each strand of said coil being wound in the aforesaid figure 8 in the same direction, means for supplying an electric current to one end of each of said coils at cycle intervals, said means being located to one side of said armature and coils, and means located on the opposite sides of said armature and coils and connected thereto for continuously drawing off the current delivered to said coils.

In testimony whereof I have affixed my signature.

JAMES M. ALLEN.